United States Patent
Buter et al.

(10) Patent No.: US 6,479,151 B2
(45) Date of Patent: Nov. 12, 2002

(54) AQUEOUS TWO-COMPONENT CROSS-LINKABLE COMPOSITION

(75) Inventors: Roelof Buter, Dieren (NL); Tom Van't Veer, Sassenheim (NL); Josephina Johanna Hendrika Maria Schlief, Nieuw-Wehl (NL); Petrus Johannes Arnoldus Geurink, Voorhout (NL)

(73) Assignee: Akzo Nobel, N.V., Arnhem (NL)

( * ) Notice: Subject to any disclaimer, the term of this patent is extended or adjusted under 35 U.S.C. 154(b) by 0 days.

(21) Appl. No.: 09/833,992

(22) Filed: Apr. 12, 2001

(65) Prior Publication Data

US 2001/0056137 A1 Dec. 27, 2001

(30) Foreign Application Priority Data

Apr. 12, 2000 (EP) .............................................. 00201327

(51) Int. Cl.[7] .............................................. B32B 27/38
(52) U.S. Cl. ........................ 428/413; 156/330; 523/404; 523/416; 523/417; 523/420; 525/533
(58) Field of Search ................................ 523/402, 404, 523/414, 416, 417, 420, 424; 525/533; 156/330; 428/413

(56) References Cited

U.S. PATENT DOCUMENTS

| 3,668,183 A | 6/1972 | Hoy et al. ..................... 260/65 |
| 4,017,438 A | 4/1977 | Jerabek et al. .............. 260/29.2 |
| 4,096,105 A | 6/1978 | McGinnis ................... 260/29.6 |
| 5,227,414 A | 7/1993 | Ernst et al. .................. 523/417 |
| 5,430,107 A | 7/1995 | Bederke et al. .............. 525/300 |
| 5,494,961 A | 2/1996 | Lavoie et al. ................ 525/102 |

FOREIGN PATENT DOCUMENTS

| EP | 0483915 A1 | 5/1992 | ......... C09D/133/06 |
| EP | 0542209 A2 | 5/1993 | ............ C08K/5/00 |

OTHER PUBLICATIONS

Jounal of Paint Technology; Polyenamine Coatings I. Formulation of Coatings and Determination of Film Properties; vol. 46, No. 591, pp. 70–75, 1974; K.L. Hoy; et al.
Journal of Paint Technology; Polyenamine Coatings II. Formulation of Coatings and Determination of Film Properties; vol. 46, No. 591, pp. 76–80, 1974; C.H. Carder, et al.
Chemical Abstract of Japanese Patent No.: 002146960 6/90.
Chemical Abstract of Japanese Patent No.: J02135266, 5/90.

Primary Examiner—Robert Dawson
Assistant Examiner—D. Aylward
(74) Attorney, Agent, or Firm—Joan M. McGillycuddy

(57) ABSTRACT

The present invention provides a water borne two-component cross-linkable composition based on an aqueous dispersion of an at least partially neutralized amino-functional epoxy derived polymer and a compound comprising at least two acetoacetate groups or acetoacetamide groups or a combination of the two groups. This composition provides coatings with high gloss, good water and solvent borne resistance, and high hardness. This composition also provides adhesives with high adhesion power.

10 Claims, No Drawings

AQUEOUS TWO-COMPONENT CROSS-LINKABLE COMPOSITION

This application claims priority of European Application No. 00201327.4, filed on Apr. 12, 2000.

BACKGROUND OF THE INVENTION

The present invention relates to a water borne two-component cross-linkable composition comprising an aqueous dispersion of an amino-functional polymer and a compound comprising at least two acetoacetate groups or acetoacetamide groups or a combination of the two groups.

The reaction mechanism by which cross-linking occurs is as follows:

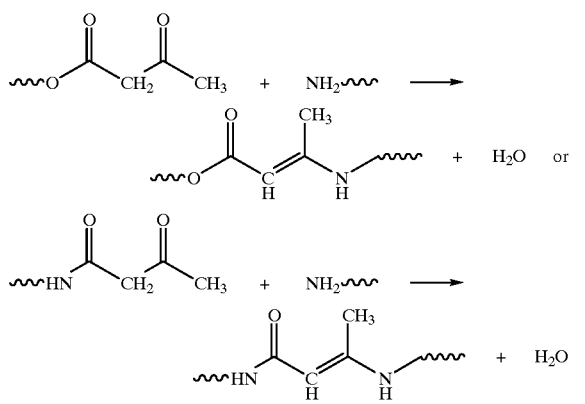

The advantage of such a two-component composition is that curing can be achieved at low temperatures, for instance ambient temperature, or in a short time at elevated temperatures, for instance 30 to 60 minutes at 60° C.

A disadvantage of such a two-component composition is a limited pot life due to premature reactions in the composition, causing a large increase in viscosity and subsequent gelation. More particularly, the reaction between a primary amino group and an acetoacetate or acetoacetamide group is much too fast for actual use in two-component systems.

In the past comparable two-component systems have been solvent borne, based on the combination of polyacetoacetates and polyketimines (ketone blocked amines), as described in U.S. Pat. No. 3,668,183, K. L. Hoy et al., *Journal of Paint Technology*, Vol. 46, No. 591, pp. 70–75 (1974), and C. H. Carder et al., *Journal of Paint Technology*, Vol. 46, No. 591, p. 76–80 (1974). These systems are in fact moisture curing systems, because the velocity determining step in this reaction is the deblocking of the ketimine into an amino group and a ketone by hydrolysis.

U.S. Pat. No. 5,227,414 discloses water borne two-component coating compositions based on an aqueous dispersion of an amino-functional polyurethane and an epoxy cross-linker. A disadvantage of these systems is that curing at ambient temperature is rather slow.

Heat curable water borne coating compositions based on an amino-functional polymer dispersion are described in U.S. Pat. No. 4,096,105. These aqueous amino-functional polymer dispersions are cross-linked by unsaturated carbonyl compounds such as acryloyl-functional compounds, and are used in cathodic electrocoating applications.

SUMMARY OF THE INVENTION

The present invention provides a water borne two-component cross-linkable composition based on an aqueous dispersion of an amino-functional epoxy derived polymer and a compound comprising at least two acetoacetate groups or acetoacetamide groups or a combination of the two groups. This composition provides coatings with high gloss, good water and solvent resistance, and high hardness. This composition also provides adhesives with high adhesion strength.

DETAILED DESCRIPTION OF THE INVENTION

According to the invention, a water borne two-component cross-linkable composition is provided comprising:

A) an aqueous dispersion of an at least partially neutralized amino-functional epoxy derived polymer and
B) a compound comprising at least two acetoacetate groups or acetoacetamide groups or a combination of the two groups.

The amino-functional epoxy derived polymer may be prepared from:

a) at least one bisepoxide compound,
b) at least one amino-functional compound comprising at least one primary amine group selected from
  1) an alkyl amine with 2 to 20 carbon atoms in the alkyl group,
  2) a polyether amine with a Mn=500 to 3000,
  3) N-alkyl amino alkyl amine, and/ or
  4) N-hydroxy alkyl amino alkyl amine, and
c) at least one compound containing at least one —NH— group and at least one ketimine group.

The bisepoxide compound (a) is preferably selected from diglycidyl ethers of Bisphenol A and F or their higher molecular weight homologues, such as Epikote® resins from Shell, i.e. Epikote® 828 and Epikote® 1001, the diglycidyl ether of hydrogenated Bisphenol A, such as Eponex® 1510 from Shell, various polyethylene glycol or polypropylene glycol diglycidyl ethers, and mixtures thereof.

Examples of alkyl amines (b1) also include alkyl amines with other functional groups such as ethanol amine. Preferably, the alkyl amine has 6 to 18 carbon atoms in the alkyl group. Typical examples thereof are octyl amine, dodecyl amine, tetradecyl amine, and mixtures thereof, such as Armeen® CD from Akzo Nobel Chemicals.

Preferably, the polyether amine (b2) is selected from $C_1$–$C_4$ alkoxy polyoxy ethylene/polyoxy propylene amine. Examples include methoxy polyoxy ethylene/polyoxy propylene amines, which are available from Texaco under the tradename Jeffamine®, such as Jeffamine® M-1000 (PO/EO=3/19; Mn=1176) and Jeffamine® M-2070 (PO/ EO=10/32; Mn=2200).

The use of N-alkyl amino alkyl amine (b3) and N-hydroxy alkyl amino alkyl amine (b4) leads to a branched structure, because these amines have a functionality of 3 towards the bisepoxide compound. Accordingly, an epoxy functionality higher than 2 is obtained. Preferred is a functionality of 2 to 3.5. With higher functionalities there is a risk of gelation during the synthesis.

One example of N-alkyl amino alkyl amine (b3) is N-ethyl ethylene diamine.

One example of N-hydroxy alkyl amino alkyl amine (b4) is 2-(2-amino ethyl amino) ethanol.

It has been found that incorporating a non-ionic polyether group into the amino-functional epoxy derived polymer provides a better colloidal stability, smaller particle size of the aqueous dispersions, and improvement in the emulsification of compound B in the amino-functional epoxy derived polymer dispersion. Accordingly, it is preferred that the amino-functional compound (b) comprising at least one primary amine group comprises a polyether amine (b2). Certain combinations of amino-functional compounds with a polyether amine (b2) are more preferred, such as a polyether amine (b2) combined with an alkyl amine (b1) with 2 to 20 carbon atoms in the alkyl group and a polyether amine (b2) with a N-hydroxy alkyl amino alkyl amine (b4).

Compounds containing at least one —NH— group and at least one ketimine group (c) are prepared by reacting a compound bearing a primary amine and a secondary amino group with a ketone. Examples of a compound bearing a primary amine and a secondary amino group include diethylene triamine, dipropylene triamine, dihexylene triamine, triethylene tetramine, tripropylene tetramine, N-amino ethyl piperazine, N-methyl-1,3-propane diamine, 2-(2-amino ethyl amino) ethanol, and N-ethyl ethylene diamine. Suitable examples of ketones include acetone, methyl ethyl ketone, diethyl ketone, methyl isobutyl ketone, dibutyl ketone, di-isobutyl ketone, ethyl amyl ketone, and methyl hexyl ketone.

The amino-functional epoxy derived polymers are preferably prepared in a first step by chain extension of the bisepoxides by the amino-functional compound comprising at least one primary amine group. The bisepoxides are used in excess, so that an epoxy terminated prepolymer is formed. In a second step the epoxy terminated prepolymer is further reacted with the ketimine compound also containing a NH group.

Depending on the molecular weight, the ketimine-functional epoxy derived polymer can be synthesised in the melt or in an organic solvent, such as a ketone, glycol ether, propylene glycol ether or a cyclic ether. Examples include methyl ethyl ketone, diethyl ketone, methyl isobutyl ketone, butyl glycol, 1-methoxy propanol, dioxane, and tetrahydrofuran. The reaction temperature ranges from 40 to 150° C. and preferably is between 60 and 120° C.

The so formed ketimine-functional epoxy derived polymer is dispersed in water with sufficient volatile organic acid to convert the ketimine groups into primary amino groups and ketones and to form an acid salt of 10 to 100% of the amino groups, preferably 20 to 75% of the amino groups, followed by removal of the ketone and the solvent by (azeotropic) distillation, optionally under reduced pressure, preferably under vacuum. Formation of acid salt groups means that 10 to 100%, preferably 20 to 75%, of the amino groups are neutralized.

Examples of useful volatile organic acids are formic acid, acetic acid, lactic acid, and propionic acid. In combination with these volatile organic acids also small amounts of other acids may be used such as sulphuric acid, hydrochloric acid, and phosphoric acid. Preferred are acetic acid and lactic acid and combinations thereof with phosphoric acid.

As the amino groups of the amino-functional epoxy derived aqueous polymer dispersions are at least partially protonated by a volatile organic acid, they effectively retard the cross-linking reaction, so that prolonged pot lives can be obtained.

A variety of dispersing techniques can be employed to disperse the ketimine-functional epoxy derived polymer in water. For example, the organic acid may be added to the ketimine-functional epoxy derived polymer solution together with a small amount of water to deblock the amino groups. This concentrated amino-functional epoxy derived polymer solution may subsequently be added to water under stirring (direct emulsification). Alternatively, after addition of the organic acid, water may be added slowly to the ketimine-functional epoxy derived polymer solution (inverse emulsification).

Said amino-functional epoxy derived polymer has an average molecular weight Mn of 500 to 10,000, preferably 1,000 to 8,000, more preferably 1,500 to 6,000, measured with Size Exclusion Chromatography using polymethyl methacrylate as standard, an amino number of 20 to 500 mg KOH/g, preferably 30 to 150 mg KOH/g, and, optionally, up to 20 wt. %, preferably 4 to 15 wt. %, of a polyether amine. The aqueous amino-functional epoxy derived polymer dispersion has a particle size of 10 to 500 nm, preferably between 15 and 300 nm, more preferably between 20 and 150 nm. Its solids content is between 20 and 50 wt. %, usually between 30 and 45 wt. %. The pH of the aqueous dispersion is between 7 and 10, preferably between 8 and 9.

The compound comprising at least two acetoacetate groups or acetoacetamide groups or a combination of the two groups (B) may be a polyacetoacetate-functional compound, a polyacetoacetamide-functional compound, or a compound comprising at least one acetoacetate group and at least one acetoacetamide group.

Preferably, the compound comprising at least two acetoacetate groups or acetoacetamide groups or a combination of the two groups (B) is an organic compound. An "organic compound" in this context is defined as a hydrocarbon compound containing no metal atoms.

The compound comprising at least two acetoacetate groups or acetoacetamide groups or a combination of the two groups (B) preferably has a functionality of 2 to 5. They can be synthesised by various methods.

Polyacetoacetates can be prepared by trans-esterification of polyhydroxyl compounds with acetoacetic acid ester. Examples are 1,6-hexane diol diacetoacetate, 1,5-pentane diol diacetoacetate, trimethylol propane triacetoacetate, pentaerythritol tetra-acetoacetate, and di-trimethylol propane tetra-acetoacetate. An acetoacetate-functional compound may also be prepared by transesterification of the reaction product of diisopropanol amine and Eponex® 1510 with t.butyl acetoacetate.

Polyacetoacetamides may be prepared from a hydroxy-functional aceto-acetamide with a polyfunctional isocyanate. Examples include the reaction product of N-(2-hydroxyethyl) acetoacetamide and a tri-isocyanate such as 4-isocyanato methyl-1,8-octane diisocyanate or a polyisocyanate such as the isocyanurate or allophanate trimer of 1,6-hexamethylene diisocyanate.

Optionally up to 15 wt. %, preferably up to 10 wt. %, of a C1-4 alkoxy polyoxyalkylene group with a Mn of 500 to 3,000 is introduced into the compound comprising at least two acetoacetate groups or acetoacetamide groups or a combination of the two groups. Such modified compound comprising at least two acetoacetate groups or acetoacetamide groups or a combination of the two groups may be obtained by reacting the above-mentioned compounds with a small amount of a polyether amine, such as the previously mentioned Jeffamines®, or a methoxy polyethylene glycol. Alternatively, a polyacetoacetate-functional resin may be prepared by reacting a polyisocyanate, an alkoxy polyethylene glycol, a diol, and t.butyl acetoacetate.

An especially useful polyacetoacetate-functional urethane has been prepared from the reaction product of 1 mole of glycerol carbonate and 1 mole of 3-amino propanol

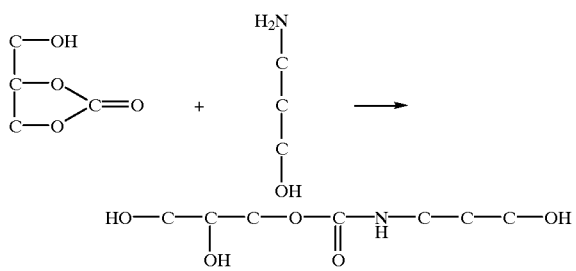

esterified with 3 moles of t-butyl acetoacetate giving a tri-functional acetoacetate urethane. Substituting a small amount of 3-amino propanol with Jeffamine® M-1000 provides a modified acetoacetate-functional compound with polyether groups incorporated therein.

It has been found that incorporating a non-ionic polyether group into the compound comprising at least two acetoacetate groups or acetoacetamide groups or a combination of the two groups improves the emulsification of compound B in water and/or the amino-functional epoxy derived polymer dispersion.

Alternatively, the compound comprising at least two acetoacetate groups or acetoacetamide groups or a combination of the two groups may be acetoacetate- and/or acetoacetamide-functional resins, such as acetoacetate-and/or acetoacetamide-functional polyacrylates or polyurethanes.

The compound comprising at least two acetoacetate groups or acetoacetamide groups or a combination of the two groups may be used as such, as a concentrated solution in an organic solvent, as a concentrated solution in water or as an aqueous emulsion.

Said compound comprising at least two acetoacetate groups or acetoacetamide groups or a combination of the two groups has an acetoacetate and/or acetoacetamide number of 150 to 500 mg KOH/g, preferably 200 to 450 mg KOH/g, and, optionally, up to 15 wt. %, preferably up to 10 wt. %, of a polyether group.

The compound comprising at least two acetoacetate groups or acetoacetamide groups or a combination of the two groups and the aqueous amino-functional epoxy derived polymer dispersion should be mixed in such a ratio that the ratio of the acetoacetate and/or acetoacetamide groups to the amino groups lies in the range from 0.2–2:1, preferably 0.5–1.5:1.

Compound B may be mixed into compound A by any suitable technique. However, simple stirring is usually sufficient. The pot life may be a few hours to several weeks. In this respect the polyacetoacetamides show much longer pot lives than the polyacetoacetates.

Optionally, an epoxy-functional compound (C) may be added to the composition. Examples of such an epoxy-functional compound include mono-epoxy functional compounds such as Cardura® E10 ex Shell, 3-glycidyloxy propyl trimethoxy silane (e.g. Silquest® A-187 ex Witco, Dynasylan® Glymo ex Degussa Hüls AG, or Dow Corning® Z-6040 ex Dow Corning), and (3,4-epoxycyclohexyl) ethyl triethoxy silane (e.g. Coatosil® 1770 ex Witco), and polyepoxy-functional compounds such as Epikote® 828 ex Shell and Ancarez® AR550 ex Air Products. The epoxy-functional compound may be used in an amount of 10 to 40 eq. % epoxy groups on $NH_2$ groups, preferably 20 to 35 eq. %.

The composition of the present invention consists essentially of water, being an aqueous composition. However, about 20 wt. % of liquid content of the composition may be an organic solvent. As suitable organic solvents may be mentioned hexylglycol, butoxyethanol, 1-methoxy-propanol-2, 1-ethoxy-propanol-2, 1-propoxy-propanol-2, 1-butoxy-propanol-2, 1-isobutoxy-propanol-2, dipropylene glycol monomethyl ether, methanol, ethanol, propanol, butanol, pentanol, hexanol, ethylene glycol, diethylene glycol, dimethyl dipropylene glycol, diacetone alcohol, methylether of diacetone alcohol, and ethoxy ethyl propionate. The VOC of the composition may range from 0 to 400 g/l, preferably from 0 to 200 g/l, most preferred is 0 to 100 g/l.

The composition may contain other compounds such as pigments, effect pigments, such as aluminium parts, UV absorbers, adhesion promotors, such as epoxy silane, HALS-type stabilisers, flow additives, fillers, dispersing agents, dyes, levelling agents, anti-cratering agents, and anti-foam agents.

The present compositions are of particular interest in coating compositions or adhesives. Preferably, a two-pack composition is used. Preferably, the first component of the two-pack coating or adhesive comprises compound A, while the second component of the composition comprises compound B. Optionally, compound C may be present in either or both components. Preferably, compound C is combined with compound B in the second component.

The composition according to the invention can be used on various substrates, in particular wood, plastics, and metal substrates such as aluminium, steel, galvanised steel, aluminium, copper, zinc, magnesium, and alloys thereof, for industrial applications of any kind.

The coating composition may be used, e.g., as a putty, primer, filler, base coat, top coat or clear coat. Preferably, the coating composition is a primer or filler. The composition is particularly advantageous for use as a coating for car repair, since it is easily sprayable and can be applied at ambient temperatures. The coating composition is also applicable in the automotive industry for the finishing of large transport vehicles, such as trains and buses, and can also be used on airplanes.

The composition can be applied using conventional spray equipment or high- and/or low volume low-pressure spray equipment, resulting in a high-quality finish. Other modes of application are roller coating, brushing, sprinkling, flow coating, dipping, electrostatic spraying or electrophoresis, spraying being preferred. Curing temperatures are preferably between 0 and 80° C. The composition may be left to dry and cure at ambient temperature over one to several days or for a shorter time at elevated temperature, for instance 20 to 60 minutes at 40 to 80° C.

The present invention is illustrated by, but not limited to the following examples.

EXAMPLES

The following components were used:

Epikote® 1001=a Bisphenol A type bisepoxide ex Shell, Mn=950

Epikote® 828=a Bisphenol A type bisepoxide ex Shell, Mn=360

Eponex® 1510=a hydrogenated Bisphenol A type bisepoxide ex Shell, Mn=450

Jeffamine® M-1000=polyether amine ex Texaco, PO/EO=3/19, Mn=1176

Armeen® CD=$C_{12-14}$ alkyl amine ex Akzo Nobel Chemicals, Mn=200

The following abbreviations were used:
NTI=4-isocyanatomethyl-1,8-octane diisocyanate
MIBK=methyl isobutyl ketone
MEK=methyl ethyl ketone
DEK=diethyl ketone
DPTA=dipropylene triamine
DETA=diethylene triamine
AEAE=2-(2-amino ethyl amino) ethanol The number average molecular weight Mn was measured with Size Exclusion Chromatography using polymethyl methacrylate as standard.

Example A1

Preparation of an aqueous dispersion of an amino-functional epoxy derived polymer A 2-liter flask fitted with a stirrer, a thermometer, a reflux condenser, and a dropping funnel was filled with 285 g Epikote® 1001 (0.3 mole)
273 g MIBK The mixture was heated to 80° C. until all the epoxide had dissolved and cooled down to 60° C. Subsequently, under a blanket of nitrogen there were added in 20 minutes:

37.6 g Jeffamine® M-1000 (0.032 mole)
33.6 g Armeen® CD (0.168 mole)

The reaction mixture was heated to 80° C. and kept at that temperature for 1 hour. Next there were added to the reaction mixture at 80° C. over a period of 30 minutes:

53.4 g diketimine of DPTA and DEK (0.2 mole)

The reaction mixture was kept at 80° C. for 2 hours and at 100° C. for 1 hour. A 60% solution of ketimine-functional epoxy derived polymer in MIBK was obtained.

To this polymer solution were added at 80° C. in 10 minutes:

12 g acetic acid (0.2 mole).
Subsequently
970 g demineralised water were added over a period of 4 hours, with the temperature gradually being decreased to ambient. The organic solvents (MIBK and DEK) were distilled off from the aqueous dispersion by gradually heating the dispersion up to 95 to 98° C. under a nitrogen overflow. A water borne amino-functional epoxy derived polymer dispersion A1 with a solids content of 33.7 wt. % was obtained. Its composition and properties are given in Table 1.

Examples A2–A7

Preparation of aqueous dispersions of amino-functional epoxy derived polymers

In the same manner as described in Example A1, different aqueous dispersions of amino-functional epoxy derived polymers were prepared. The composition and properties of these polymers are provided in Table 1.

TABLE I

|  | A1 | A2 | A3 | A4 | A5 | A6 | A7 |
|---|---|---|---|---|---|---|---|
| Components of the polymer (in moles) | | | | | | | |
| Epikote ® 1001 | 0.3 | — | — | 3.0 | 3.0 | 3.0 | 3.0 |
| Epikote ® 828 | — | 6.6 | — | — | — | — | — |
| Eponex ® 1510 | — | — | 5.8 | — | — | — | — |
| Octyl amine | — | 5.28 | 4.48 | — | — | 1.6 | — |
| Armeen ® CD | 0.168 | — | — | 1.6 | 1.5 | — | 1.68 |
| Jeffamine ® M-1000 | 0.032 | 0.32 | 0.32 | 0.4 | 0.5 | 0.4 | 0.32 |
| Diketimine of DPTA and DEK | 0.2 | 2.0 | 2.0 | 2.0 | 2.0 | 2.0 | 2.0 |
| Acetic acid | 0.2 | 2.0 | 2.0 | 2.0 | 2.0 | 2.0 | — |
| Lactic acid | — | — | — | — | — | — | 2.0 |
| Properties of the aqueous polymer dispersion | | | | | | | |
| Degree of neutralisation (%) | 50 | 50 | 50 | 50 | 50 | 50 | 50 |
| Wt. % polyether | 9.8 | 9.8 | 9.8 | 12.1 | 14.7 | 12.4 | 9.8 |
| Amino value (mg KOH/g) | 58.6 | 58.8 | 58.5 | 57.4 | 56.0 | 59.1 | 58.7 |
| Wt. % solids | 33.7 | 30.6 | 32.5 | 34.4 | 34 | 32.8 | 33.3 |
| Particle size (nm) | 34 | 89 | 65 | 33 | 29 | 41 | 31 |
| Viscosity (mPa.s) | 90 | 430 | 220 | 100 | 70 | 50 | 100 |
| pH | 8.7 | 8.7 | 8.4 | 8.9 | 8.9 | 8.8 | 8.8 |
| Mn | 4730 | n.d. | n.d. | n.d. | n.d. | n.d. | n.d. | n.d. = not determined

Examples A8–A12

Preparation of aqueous dispersions of amino-functional epoxy derived polymers

In the same manner as described in Example A1, different aqueous dispersions of amino-functional epoxy derived polymers were prepared. The composition and properties of these polymers are provided in Table 2.

TABLE 2

|  | A8 | A9 | A10 | A11 | A12 |
|---|---|---|---|---|---|
| Components of the polymer (in moles) | | | | | |
| Epikote ® 1001 | 2.21 | 1.65 | 1.58 | 1.72 | 1.62 |
| Epikote ® 828 | 2.32 | 1.55 | 2.24 | 1.46 | 2.18 |
| AEAE | 1.40 | 1.0 | 1.3 | 1.0 | 1.3 |
| Jeffamine ® M-1000 | 0.34 | 0.2 | 0.22 | 0.18 | 0.2 |
| Diketimine of AEAE and MIBK | 4.20 | 3.0 | 3.3 | 3.0 | 3.3 |
| Acetic acid | 2.1 | 1.5 | 1.65 | 1.5 | 1.65 |
| Properties of the aqueous |  |  |  |  |  |

TABLE 2-continued

|  | A8 | A9 | A10 | A11 | A12 |
|---|---|---|---|---|---|
| polymer dispersion | | | | | |
| Degree of neutralisation (%) | 50 | 50 | 50 | 50 | 50 |
| Wt. % polyether | 10 | 8.4 | 8.4 | 7.5 | 7.6 |
| Amino value (mg KOH/g) | 59.4 | 59.8 | 59.8 | 59.6 | 59.8 |
| Wt. % solids | 33.5 | 32.8 | 33.7 | 32.7 | 34 |
| Particle size (nm) | 29 | 22 | 33 | 25 | 36 |
| Viscosity (mPa · s) | 80 | 70 | 180 | 70 | 230 |
| pH | 8.7 | 8.9 | 9 | 9 | 9 |

Examples A13–A20
Preparation of aqueous dispersions of amino-functional epoxy derived polymers In the same manner as described in Example A1, different aqueous dispersions of amino-functional epoxy derived polymers were prepared. The composition and properties of these polymers are provided in Table 3.

23.5 g Jeffamine® M-1000 (0.02 mole)
36 g Armeen® CD (0.18 mole)

The reaction mixture was heated to 80° C. and kept at that temperature for 1 hour. Next there were added to the reaction mixture at 80° C. over a period of 30 minutes:

53.4 g diketimine of DETA and MIBK (0.2 mole)

The reaction mixture was kept at 80° C. for 2 hours and at 100° C. for 1 hour. A 60% solution of ketimine-functional epoxy derived polymer in MIBK was obtained.

To this polymer solution were subsequently added at 80° C.:

7.2 g acetic acid (0.12 mole)
72 g demineralised water.

To deblock the amino groups in the ketimine-functional polymer, the reaction mixture was kept at 80° C. for 1 hour.

Next, the amino-functional polymer solution was poured out in 800 g of demineralised water over a period of 30 minutes under vigorous stirring. Subsequently, the organic solvent (MIBK) was removed from the aqueous dispersion by azeotropic distillation at 50 to 70° C. under reduced pressure.

TABLE 3

|  | A13 | A14 | A15 | A16 | A17 | A18 | A19 | A20 |
|---|---|---|---|---|---|---|---|---|
| Components of the polymer (in moles) | | | | | | | | |
| Epikote ® 1001 | 3.0 | 3.0 | 2.0 | 1.2 | 3.0 | 2.0 | 1.2 | 2.0 |
| Epikote ® 828 | — | — | 1.0 | 1.8 | — | 1.0 | 1.8 | 1.0 |
| Armeen ® CD | 1.68 | — | — | — | — | — | — | 1.82 |
| Octyl amine | — | 1.68 | 1.82 | 1.9 | 1.6 | 1.675 | 1.73 | — |
| Jeffamine ® M-1000 | 0.32 | 0.32 | 0.18 | 0.1 | 0.4 | 0.325 | 0.27 | 0.18 |
| Diketimine of DETA and MIBK | 2.0 | 2.0 | 2.0 | 2.0 | 2.0 | 2.0 | 2.0 | 2.0 |
| Acetic acid | 2.0 | 2.0 | 2.0 | 2.0 | 2.0 | 2.0 | 2.0 | 2.0 |
| Properties of the aqueous polymer dispersion | | | | | | | | |
| Degree of neutralisation (%) | 50 | 50 | 50 | 50 | 50 | 50 | 50 | 50 |
| Wt. % polyether | 10.0 | 10.3 | 7.2 | 4.9 | 12.4 | 12.4 | 12.4 | 6.9 |
| Amino value (mg KOH/g) | 59.6 | 61.5 | 76.4 | 93.6 | 59.1 | 72.6 | 87.1 | 73.3 |
| Wt. % solids | 31.4 | 32 | 39.6 | 38.6 | 34.2 | 38.9 | 38.3 | 34.2 |
| Particle size (nm) | 43 | 34 | 33 | 28 | 35 | 24 | 18 | 96 |
| Viscosity (mPa.s) | 40 | 30 | 360 | 300 | 80 | 290 | 240 | 70 |
| pH | 8.5 | 8.6 | 8.8 | 9.1 | 8.6 | 8.9 | 9.1 | 8.9 |
| Mn | n.d. | 4980 | n.d. | n.d. | n.d. | n.d. | n.d. | n.d. | n.d. = not determined

Examples A21–A24
Preparation of aqueous dispersions of amino-functional epoxy derived polymers In the same manner as described in Example A1, different aqueous dispersions of amino-functional epoxy derived polymers were prepared. The composition and properties of these polymers are provided in Table 4.

Example A25
Preparation of an aqueous dispersion of an amino-functional epoxy derived polymer A 2-liter flask fitted with a stirrer, a thermometer, a reflux condenser, and a dropping funnel was filled with 190 g Epikote® 1001 (0.2 mole)
36 g Epikote® 828 (0.1 mole)
226 g MIBK The mixture was heated to 80° C. until all the epoxide had dissolved and cooled down to 60° C. Subsequently, under a blanket of nitrogen there were added in 20 minutes:

The composition and properties of polymer A25 are given in Table 4.

TABLE 4

|  | A21 | A22 | A23 | A24 | A25 |
|---|---|---|---|---|---|
| Components of the polymer (in moles) | | | | | |
| Epikote ® 1001 | 2.0 | 2.0 | 2.0 | 2.0 | 2.0 |
| Epikote ® 828 | 1.0 | 1.0 | 1.0 | 1.0 | 1.0 |
| Jeffamine ® M-1000 | 0.2 | 0.2 | 0.2 | 0.2 | 0.2 |
| Armeen ® CD | 1.8 | 1.8 | 1.8 | 1.8 | 1.8 |
| Diketimine of DETA and MIBK | 2.0 | 2.0 | 2.0 | 2.0 | 2.0 |
| Acetic acid | 2.0 | 1.6 | 1.2 | 1.0 | 1.2 |
| Properties of the aqueous polymer dispersion | | | | | |
| Degree of neutralisation (%) | 50 | 40 | 30 | 25 | 30 |
| Wt. % polyether | 7.6 | 7.6 | 7.6 | 7.6 | 7.6 |

TABLE 4-continued

|  | A21 | A22 | A23 | A24 | A25 |
|---|---|---|---|---|---|
| Amino value (mg KOH/g) | 72.7 | 72.7 | 72.7 | 72.7 | 72.7 |
| Wt. % solids | 37.8 | 30 | 34.3 | 37.3 | 33.2 |
| Particle size (nm) | 26 | 37 | 61 | 119 | 53 |
| Viscosity (mPa · s) | 310 | 30 | 140 | 430 | 220 |
| pH | 8.6 | 8.7 | 8.9 | 9 | 9 |
| Mn | 2840 | n.d. | n.d. | n.d. | n.d. | n.d. = not determined

Examples A26–A29

Preparation of aqueous dispersions of amino-functional epoxy derived polymers

In the same manner as described in Example A1, different aqueous dispersions of amino-functional epoxy derived polymers were prepared. The composition and properties of these polymers are provided in Table 5.

TABLE 5

|  | A26 | A27 | A28 | A29 |
|---|---|---|---|---|
| Components of the polymer (in moles) | | | | |
| Epikote ® 828 | — | — | — | 4.5 |
| Eponex ® 1510 | 4.0 | 4.0 | 5.0 | — |
| Octyl amine | 3.0 | 3.0 | 4.0 | 3.5 |
| Diketimine of DETA and MIBK | 2.0 | 2.0 | 2.0 | 2.0 |
| Acetic acid | 1.2 | 1.0 | 1.2 | 3.0 |
| Properties of the aqueous polymer dispersion | | | | |
| Degree of neutralisation (%) | 30 | 25 | 30 | 75 |
| Amino value (mg KOH/g) | 93.6 | 93.6 | 75.5 | 94.8 |
| Wt. % solids | 31.3 | 31.5 | 38.5 | 34.8 |
| Particle size (nm) | 67 | 88 | 86 | 246 |
| Viscosity (mPa · s) | 700 | 710 | 540 | 130 |
| pH | 9 | 9.1 | 9 | 7.9 |
| Mn | 2170 | n.d. | n.d. | n.d. | n.d. = not determined

Examples A30–A31

Preparation of aqueous dispersions of amino-functional epoxy derived polymers

In the same manner as described in Example A1, different aqueous dispersions of amino-functional epoxy derived polymers were prepared. The composition and properties of these polymers are provided in Table 6.

TABLE 6

|  | A30 | A31 |
|---|---|---|
| Components of the polymer (in moles) | | |
| Epikote ® 1001 | 2.0 | 2.0 |
| Epikote ® 828 | 1 | 1 |
| Armeen ® CD | 1.8 | 1.8 |
| Jeffamine ® M-1000 | 0.2 | 0.2 |
| Diketimine of DETA and MIBK | 2.0 | 2.0 |
| Propionic acid | 1.2 | 1.6 |
| Properties of the aqueous polymer dispersion | | |
| Degree of neutralisation (%) | 30 | 40 |
| Wt. % polyether | 7.6 | 7.6 |
| Amino value (mg KOH/g) | 72.8 | 72.8 |
| Wt. % solids | 26.9 | 32.9 |

TABLE 6-continued

|  | A30 | A31 |
|---|---|---|
| Viscosity (mPa · s) | 550 | 980 |
| Ph | 9.0 | 8.8 |

Example B1

Preparation of an acetoacetate-functional compound

The reaction product of 1 mole of glycerol carbonate and 0.02 mole of Jeffamine® M-1000 and 0.98 mole 3-amino propanol-1 was transesterified with 3 moles of t-butyl acetoacetate under removal by distillation of 3 moles t-butanol. The tri-acetoacetate-functional compound has an acetoacetate equivalent weight of 156 (359 mg KOH/g) and 5.0 wt. % polyether groups.

Example B2

Preparation of an acetoacetamide-functional compound

An acetoacetamide-functional compound was obtained by reacting 1 mole of NTI and 2.95 moles of N-(2-hydroxyethyl)acetoacetamide and 0.05 mole of methoxy polyethylene glycol (Mn=750). The acetoacetamide-functional compound has an acetoacetamide functionality of 2.95, an acetoacetamide equivalent weight of 243 (230 mg KOH/g), and 5.2 wt. % polyether groups. It has a solids content of 80% in water.

Acetoacetate-functional compound B3

Di-(1,1,1-trimethylol propane) tetra acetoacetate. Functionality: 4, acetoacetate equivalent weight: 146.5 (382 mg KOH/g).

Acetoacetate-functional compound B4

1.5-Pentanediol diacetoacetate. Functionality: 2, acetoacetate equivalent weight: 136 (412 mg KOH/g).

Acetoacetate-functional compound B5 1,1,1-Trimethylol propane tri-acetoacetate, Lonzamon MTMP ex Lonza AG. Functionality: 3, acetoacetate equivalent weight: 128.7 (435 mg KOH/g)

Examples 1 to 30

Unless otherwise stated, the examples were carried out as follows.

The aqueous amino-functional epoxy derived polymer dispersions A were mixed with the compound comprising at least two acetoacetate groups or acetoacetamide groups or a combination of the two groups B in a ratio of amino groups to acetoacetate and/or acetoacetamide groups of 1:1.

The mixture was applied with a 200µ draw bar on steel panels (Bonder 120) and allowed to dry and cure at ambient temperature. The properties of the resulting coatings are listed in Tables 7 to 12.

The Persoz hardness was determined in accordance with ISO 1522, expressed in seconds.

The solvent and water resistance was measured after 1 week of drying at room temperature. After exposure to gasoline and MEK for 1 minute and to water for 1 hour the panels were judged on a scale of 1 to 10, where 10=excellent; no change in the film properties; 8=good; 6=sufficient; 4=insufficient; 2=poor; 1=very poor; and b=blisters.

The gel time was determined visually.

TABLE 7

| Ex. | Composition | Gel time | Persoz Hardness 1 day | Persoz Hardness 1 week | Resistance to water |
|---|---|---|---|---|---|
| 1. | A9 - B1 | <1 hour | 250 | 254 | 4/5b |
| 2. | A9 - B1 (pH = 7*) | >1 week | 145 | 136 | 4b |
| 3. | A10 - B1 (pH = 7*) | >1 week | 150 | 147 | 4/5b |
| 4. | A11 - B1 | ±1 hour | 261 | 277 | 5b |
| 5. | A11 - B1 (pH = 7*) | >1 week | 160 | 152 | 4/5 |
| 6. | A12 - B1 (pH = 7*) | >1 week | 171 | 160 | 4/5b |

*acetic acid added to compound A until pH = 7

TABLE 8

| Ex. | Composition | Gel time | Persoz Hardness 1 day | Persoz Hardness 1 week | Resistance after 2 weeks to gasoline | MEK | water |
|---|---|---|---|---|---|---|---|
| 7. | A13-B1 | 3 h 15 | 233 | 233 | 10 | 6/7 | 7/8 |
| 8. | A13-B1 (pH = 7*) | >1 week | 186 | 171 | 10 | 5 | 7 |
| 9. | A14-B1 | 2 h 10 | 259 | 249 | 10 | 6/7 | 7/8 |
| 10. | A14-B1 (pH = 7*) | >1 week | 208 | 200 | 10 | 6 | 8 |

*phosphoric acid added to compound A until pH = 7

TABLE 9

| Ex. | Composition | Gel time | Persoz Hardness 1 day | Persoz Hardness 1 week | Resistance to gasoline | MEK | water |
|---|---|---|---|---|---|---|---|
| 11. | A15-B1 | ±1 hour | 241 | 275 | 10 | 6/7 | 8/10 |
| 12. | A15-B1 (pH = 7*) | >5 days | 148 | 199 | 10 | 7 | 7/8 |
| 13. | A16-B1 | ±15 min. | 255 | 311 | 10 | 7 | 10 |
| 14. | A16-B1 (pH = 7*) | >5 days | 169 | 212 | 10 | 7 | 7/8 |
| 15. | A17-B1 | 1 h 05 | 183 | 212 | n.d. | 6/7 | 7/8 |
| 16. | A18-B1 | 50 min. | 201 | 176 | n.d. | 6/7 | 7/8 |
| 17. | A19-B1 | 40 min. | 171 | 151 | n.d. | 6/7 | 7/8 |
| 18. | A20-B1 | >1 week | 178 | 197 | n.d. | 6/7 | 7/8 |

*acetic acid added to compound A until pH = 7
n.d. = not determined

TABLE 10

| Ex. | Composition | Gel time | Persoz Hardness 1 day | Persoz Hardness 1 week | Resistance after 1 day to MEK | water |
|---|---|---|---|---|---|---|
| 19. | A14 - B3 | 45 min. | 232 | 322 | 6/7 | 8 |
| 20. | A14 - B3* | 1 h 15 | 218 | 270 | 6/7 | 8/10 |
| 21. | A14 - B4 | >1 week | 187 | 222 | 4 | 8 |
| 22. | A14 - B4* | >1 week | 115 | 152 | 4 | 7/8 |
| 23. | A14 - B5 | <1 hour | 240 | 307 | 6/7 | 8/10 |
| 24. | A14 - B5* | <2 hours | 203 | 257 | 6/7 | 7/8 |

*containing 5 wt. % on solids dimethyl dipropylene glycol as cosolvent

TABLE 11

| Ex. | Composition | Gel time | Persoz Hardness 1 day | Persoz Hardness 1 week | Resistance to water**** |
|---|---|---|---|---|---|
| 25. | A14 - B4/B5*//* | >24 hours | 186 | 176 | 8 |
| 26. | A14 - B3/B4*//* | >24 hours | 198 | 187 | 8 |

*containing 5 wt. % on solids dimethyl dipropylene glycol as cosolvent
**molar ratio of 1:1 for mixtures of B4/B5 and B3/B4
***amine: acetoacetate ratio = 1:0.75
****after 1 day drying

TABLE 12

| Ex. | Composition | Gel time | Persoz Hardness 1 day | Persoz Hardness 1 week | Resistance to*** MEK | water |
|---|---|---|---|---|---|---|
| 27. | A21 - B5*/** | >24 hours | 213 | 219 | 6/7 | 6b |
| 28. | A22 - B5*/** | >24 hours | 194 | 211 | 6/7 | 7/8 |
| 29. | A23 - B5*/** | 3 h 15 | 210 | 230 | 6/7 | 8 |
| 30. | A24 - B5*/** | 2 h 30 | 206 | 188 | 6 | 10 |

*containing 5 wt. % on solids dimethyl dipropylene glycol as cosolvent
**amine: acetoacetate ratio = 1:0.75
***after 1 day drying Examples 31–39

The aqueous amino-functional epoxy derived polymer dispersions A were mixed with the compound comprising at least two acetoacetate groups or acetoacetamide groups or a combination of the two groups B in a ratio of amino groups to acetoacetate and/or acetoacetamide groups of 1:0.75.

The mixture was applied with a draw bar of 200µ on steel panels (Bonder 120), and allowed to dry and cure at ambient temperature. The properties of the obtained coatings are listed in the Tables 13 and 14.

The Persoz hardness was determined in accordance with ISO 1522 expressed in seconds.

The solvent and water resistance was measured after 1 day of drying at room temperature. After exposure to MEK for 1 minute and to water for 1 hour or 4 hours the panels were judged on a scale of 1 to 10.

TABLE 13

| Ex. | Composition | Application after a pot life of | Gel time | Persoz Hardness 1 day | Persoz Hardness 1 week | Resistance to MEK | Resistance to Water (4 h) |
|---|---|---|---|---|---|---|---|
| 31. | A30-B5* | 20 min. | — | 198 | 171 | 6/7 | 6/7 |
| 32. | A30-B5* | 60 min. | 2–20 hours | 197 | 166 | n.d. | 6 |
| 33. | A31-B5* | 20 min. | — | 183 | 161 | 6/7 | 7/8 |
| 34. | A31-B5* | 60 min. | >20 hours | 185 | 153 | n.d. | 6 | n.d. = not determined
*containing 10 wt. % on solids dimethyl dipropylene glycol as cosolvent

TABLE 14

| Ex. | Composition | Application after | Gel time | Persoz Hardness 1 day | Persoz Hardness 1 week | Resistance to MEK | Resistance to Water (1 h) |
|---|---|---|---|---|---|---|---|
| 35. | A23-B5* | 20 min. | <16 hours | 178 | 183 | 6/7 | 8 |
| 36. | A23-B2* | 20 min. | — | 130 | 132 | 7 | 6 |
| 37. | A23-B2* | 16 hours | >24 hours | 155 | 130 | 7 | 6 |
| 38. | A23-B2*/** | 20 min. | — | 109 | 114 | 7 | 5/6 |
| 39. | A23-B2*/** | 16 hours | >24 hours | 135 | 124 | 7 | 6 |

*containing 10 wt. % on solids dimethyl dipropylene glycol as cosolvent
**molar ratio NH$_2$: acetoacetate 1:1

Example 40 and Comparative Examples A–C
Application on wood

A mixture of compound A23 and compound B1 was sprayed on a pinewood panel in a dry layer thickness of about 60 μm and dried and cured for 16 hours at 60° C.

As references three water borne coating compositions were used:
a) a water borne physically dryable acrylic latex, Supercryl ex Akzo Nobel
b) a water borne self cross-linkable acrylic dispersion, Neocryl XK-14 ex Zeneca
c) a water borne hydroxy-functional polyester dispersion, Adura 100 ex Air Products combined with Vestanat T1890 ex Hüls.

Measured were
the ethanol resistance after 1 and 6 hours;
the acetone resistance (after 2 minutes of exposure); and
the water resistance (after 24 hours of exposure)
judged on a scale of 0 to 5; where 0=poor and 5=excellent.

The same coating compositions were sprayed on a pinewood panel in a dry layer thickness of about 60 μm and cured for 30 minutes at 60° C. and 16 hours room temperature. Measured was the blocking resistance.

The results are given in Table 15.

TABLE 15

| Ex. | Composition | Blocking | Resistance to Ethanol 1 hr/6 hrs | Resistance to Water | Resistance to Acetone |
|---|---|---|---|---|---|
| 40. | A23 - B1 | 5 | 3–4/3 | 4–5 | 5 |
| A | Supercryl | 5 | 2/2 | 3–4 | 3 |
| B | Neocryl XK-14 | 5 | 2/2 | 5 | 1 |
| C | Adura 100/Vestanat T1890 | 1 | 5/4 | 3 | 2 |

Examples 41–47 and Comparative Example D
Application as adhesive

Five clear coat compositions and two pigmented compositions based on mixtures of compounds A and B were applied on a piece of wood onto which another piece of wood was pressed. The glued surface was 6.25 cm² (2.5 by 2.5 cm).

After one week of conditioning, the pieces of wood were separated by being pulled apart. The failing force is a measure of the adhesion power.

The reference used was a two-component system based on a hydroxyl-functional acrylic latex and a polyisocyanate cross-linker, Synteko 1984 and 1993 ex Akzo Nobel. The results are given in Table 16.

TABLE 16

| Ex. | Composition | Failing force (MPa) |
|---|---|---|
| 41. | A6 - B1 | 6.5* |
| 42. | A15 - B1 | 7.0* |
| 43. | A16 - B5 - extenders (PVC = 25%) | 4.9* |
| 44. | A26 - B5 | 6.8* |
| 45. | A26 - B5 - extenders (PVC = 25%) | 6.5* |
| 46. | A27 - B5 | 7.3* |
| 47. | A29 - B2 | 8.0* |
| D | Reference | 5.5* |

*wood fracture

Example 48
Primer coating composition

Component 1 was prepared by mixing:

| | |
|---|---|
| 86.07 g | A25 |
| 2.26 g | 20% acetic acid in water |
| 28.30 g | conventional fillers |
| 29.31 g | conventional pigments |
| 4.08 g | conventional additives |

-continued

Component 2 was prepared by mixing:

| 3.77 g | B5 |
|---|---|
| 7.51 g | conventional solvents |

The primer coating composition was prepared by mixing component 1 and component 2 and bringing the whole up to a ready-to-spray viscosity of 24 seconds (DINC 4) by adding 36 g demineralised water. The coating composition was sprayed on a steel panel and dried at room temperature. After 4 hours of drying time, the sandability was very good. After 1 day of drying time, the adhesion on steel was very good. Other properties are listed in Table 17. The solvent and the water resistance were measured after 1 day of drying.

TABLE 17

| | | Persoz Hardness | | Resistance to | | |
|---|---|---|---|---|---|---|
| Ex. | Composition | 1 day | 1 week | gasoline | MEK | water |
| 48 | A2-B5 | 85 | 97 | 10 | 6/7 | 7 |

After application of a black top coat, Autocryl LV ex Akzo Nobel, the enamel hold out was visually determined to be very good, the gloss measured according to ISO 2813 was higher than 80 GU at 20°, and the water immersion after 1 week showed no blistering.

We claim:

1. A water borne two-component cross-linkable composition comprising:
   A) an aqueous dispersion of an at least partially neutralized amino-functional epoxy derived polymer; and
   B) an organic compound comprising at least two acetoacetate groups or acetoacetamide groups or a combination of the two groups.

2. A composition according to claim 1, wherein the amino-functional epoxy derived polymer is prepared from:
   a) at least one bisepoxide compound,
   b) at least one amino-functional compound comprising at least one primary amine group selected from
      1. an alkyl amine with 2 to 20 carbon atoms in the alkyl group,
      2. a polyether amine with a Mn=500 to 3,000,
      3. N-alkyl amino alkyl amine, and/or
      4. N-hydroxy alkyl amino alkyl amine, and
   c) at least one compound containing at least one —NH— group and at least one ketimine group.

3. A composition according to claim 2, wherein the amino-functional compound (b) comprises a polyether amine with a Mn=500 to 3,000 (b2).

4. A composition according to claim 3, wherein the amino-functional compound (b) additionally comprises an alkyl amine with 2 to 20 carbon atoms in the alkyl group (b1) or N-hydroxy alkyl amino alkyl amine (b4).

5. A composition according to claim 1, wherein 10 to 100% of the amino groups of the amino-functional epoxy derived polymer are neutralized with a volatile organic acid.

6. A composition according to claim 5, wherein the volatile organic acids are selected from formic acid, acetic acid, lactic acid, and propionic acid, optionally in combination with sulphuric acid, hydrochloric acid, and phosphoric acid.

7. A composition according to claim 1, wherein the amino-functional epoxy derived polymer has an average molecular weight Mn of 500 to 10,000, an amino number of 20 to 500 mg KOH/g, and, optionally, up to 20 wt. % of a polyether amine.

8. A composition according to claim 1, wherein the compound comprising at least two acetoacetate groups or acetoacetamide groups or a combination of the two groups (B) is trimethylol propane triacetoacetate.

9. A composition according to claim 1 applied to a substrate.

10. A method of using the composition according to claim 1 as an adhesive.

* * * * *